United States Patent
Ho

(10) Patent No.: US 9,662,835 B2
(45) Date of Patent: May 30, 2017

(54) PRINTING HEAD MODULE AND THREE DIMENSIONAL PRINTING APPARATUS USING THE SAME

(71) Applicants: XYZprinting, Inc., New Taipei (TW); Kinpo Electronics, Inc., New Taipei (TW); Cal-Comp Electronics & Communications Company Limited, New Taipei (TW)

(72) Inventor: Kwan Ho, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 204 days.

(21) Appl. No.: 14/156,462

(22) Filed: Jan. 16, 2014

(65) Prior Publication Data
US 2015/0056318 A1 Feb. 26, 2015

Related U.S. Application Data

(60) Provisional application No. 61/869,079, filed on Aug. 23, 2013.

(30) Foreign Application Priority Data

Oct. 21, 2013 (TW) .............................. 102137938 A

(51) Int. Cl.
*B29C 67/00* (2017.01)
(52) U.S. Cl.
CPC ...... *B29C 67/0055* (2013.01); *B29C 67/0059* (2013.01); *B29C 67/0085* (2013.01)

(58) Field of Classification Search
CPC . B29C 67/0085; B29C 67/0062; B29C 67/06; B29C 67/02; B29C 67/0051;
(Continued)

(56) References Cited

U.S. PATENT DOCUMENTS 2,578,492 A * 12/1951 Simpkins ................ B29C 33/00
249/110
3,936,262 A * 2/1976 Hehl ........................ B29C 45/22
137/561 A
(Continued)

FOREIGN PATENT DOCUMENTS

JP 2002500966 1/2002
JP 2004504177 2/2004

OTHER PUBLICATIONS

"Notice of Allowance of Japan Counterpart Application", issued on Aug. 4, 2015, p. 1, in which the listed references were cited.

*Primary Examiner* — Alison L Hindenlang
*Assistant Examiner* — Emmanuel S Luk
(74) *Attorney, Agent, or Firm* — Jianq Chyun IP Office

(57) ABSTRACT

A printing head module and a three dimensional (3-D) printing apparatus using the same are provided. The 3-D printing apparatus includes a base and the printing head module. The printing head module is disposed above the base and includes a printing head and at least one material spool. The printing head includes a plurality of assembling pieces assembled with each other to form the printing head and define a nozzle of the printing head. Each of the assembling pieces includes at least one material-supply groove. The material-supply grooves of any two adjacent assembling pieces are located corresponding to each other to form at least one material-supply channel together. Each material spool is connected to the material-supply channel for providing at least one fluid material to the material- (Continued)

supply channel. The fluid material is transmitted via the material-supply channel to be dispensed on the base.

22 Claims, 5 Drawing Sheets

(58) Field of Classification Search
CPC .. B29C 67/0059; B29C 67/0055; D01D 4/02; D01D 4/027
USPC .............. 425/375, 192 S, 378.2, 382.2
See application file for complete search history.

(56) References Cited

U.S. PATENT DOCUMENTS

| | | | | |
|---|---|---|---|---|
| 5,121,329 A * | 6/1992 | Crump | ............ | B22F 3/115 228/180.5 |
| 5,930,882 A * | 8/1999 | Gellert | ............ | B23P 15/007 228/171 |
| 6,129,872 A * | 10/2000 | Jang | ............ | B29C 41/36 264/245 |
| 6,444,159 B2 * | 9/2002 | Petre | ............ | B29C 49/4823 249/102 |
| 6,454,972 B1 * | 9/2002 | Morisette | ............ | B29B 7/401 264/236 |
| 7,207,796 B2 * | 4/2007 | Rosner | ............ | B29C 45/1603 425/130 |
| 8,845,321 B2 * | 9/2014 | Neter | ............ | B29C 45/7312 249/79 |
| 2005/0276879 A1 * | 12/2005 | Niewels | ............ | B29C 45/7312 425/547 |
| 2009/0162473 A1 * | 6/2009 | Neter | ............ | B29C 45/7312 425/547 |
| 2010/0007692 A1 * | 1/2010 | Vanmaele | ............ | B29C 67/0055 347/21 |
| 2010/0327479 A1 * | 12/2010 | Zinniel | ............ | B29C 47/0014 264/172.14 |
| 2014/0070461 A1 * | 3/2014 | Pax | ............ | B29C 67/0055 264/401 |
| 2014/0183792 A1 * | 7/2014 | Leu | ............ | B29C 47/0071 264/401 |
| 2014/0277661 A1 * | 9/2014 | Amadio | ............ | B29C 67/0055 700/97 |
| 2015/0056317 A1 * | 2/2015 | Chen | ............ | B29C 67/0055 425/130 |
| 2015/0093465 A1 * | 4/2015 | Page | ............ | B29C 67/0088 425/132 |
| 2015/0097307 A1 * | 4/2015 | Batchelder | ............ | B29C 67/0055 264/40.6 |
| 2015/0182811 A1 * | 7/2015 | Bender | ............ | A63B 45/00 473/376 |
| 2015/0183161 A1 * | 7/2015 | Molinari | ............ | B29C 67/0085 425/375 |
| 2015/0183167 A1 * | 7/2015 | Molinari | ............ | B29C 67/0088 425/167 |
| 2015/0266235 A1 * | 9/2015 | Page | ............ | B29C 67/0007 264/245 |

* cited by examiner

PRINTING HEAD MODULE AND THREE DIMENSIONAL PRINTING APPARATUS USING THE SAME

CROSS-REFERENCE TO RELATED APPLICATION

This application claims the priority benefits of U.S. provisional application Ser. No. 61/869,079, filed on Aug. 23, 2013 and Taiwan application serial no. 102137938, filed on Oct. 21, 2013. The entirety of each of the above-mentioned patent applications is hereby incorporated by reference herein and made a part of this specification.

BACKGROUND

Technical Field

The technical field relates to a printing head module and a printing apparatus using the same and more particularly relates to printing head module and a three dimensional printing apparatus using the same.

Description of Related Art

Due to the progress in computer-aided manufacturing (CAM), manufacturers have developed the technology of three dimensional (3-D) printing for rapidly embodying an original design concept. In fact, the 3-D printing technology is a collective term referring to a series of rapid prototyping (RP) techniques, and the basic principle is laminate manufacture, wherein a rapid prototyping machine is used to form cross-sectional shapes of a workpiece in the X-Y plane through scanning, shift intermittently at a layer thickness in the Z coordinates, and ultimately form 3-D objects. The 3-D printing technology is applicable regardless of the geometric shapes and the RP technology produces excellent outputs in particular for complex parts, which saves efforts and processing time significantly. The 3-D printing technology is capable of presenting an object of a digital 3-D model designed by means of computer-aided design (CAD) software in less time for the user to touch and actually feel the geometry of the model, or even to test the assemblability of the parts and possible functions.

However, the current 3-D printing apparatuses that utilize the aforementioned rapid prototyping technology are equipped with integrally-formed printing heads, which are inconvenient for cleaning or replacement. If a defect occurs in the manufacturing process of the printing head, the whole printing head becomes unusable, which increases the production costs of the 3-D printing apparatuses. Moreover, most of the current 3-D printing apparatuses only provide monochrome printing. In other words, they can only produce 3-D objects in one single color. For color-variable 3-D printing apparatuses, the whole set of printing head needs to be replaced manually in order to change the construction material therein. Thus, the current 3-D printing equipment is rather inconvenient and takes manpower, and the 3-D objects they produce have limited variability and flexibility.

SUMMARY

The disclosure provides a three dimensional (3-D) printing apparatus having a printing head that is assembled by a plurality of assembling pieces to simplify the manufacturing process and further reduce the production costs.

The 3-D printing apparatus of the exemplary embodiment includes a base and a printing head module. The printing head module is disposed above the base and includes a printing head and at least one material spool. The printing head includes a plurality of assembling pieces that are assembled with each other to form the printing head and together define a nozzle of the printing head. Each of the assembling pieces includes at least one material-supply groove. The material-supply grooves of any two adjacent assembling pieces are disposed corresponding to each other to form at least one material-supply channel together. Each material spool is connected to the material-supply channel for providing at least one fluid material to the material-supply channel. The fluid material is transmitted via the material-supply channel to be dispensed on the base.

In an exemplary embodiment, a printing head module is capable of supplying at least one fluid material and dispensing the fluid material on a base. The printing head module includes a plurality of assembling pieces and at least one material spool. The assembling pieces are assembled with each other to form a printing head and together define a nozzle of the printing head. Each of the assembling pieces includes at least one material-supply groove. The material-supply grooves of any two adjacent assembling pieces are disposed corresponding to each other to form at least one material-supply channel together. The material spool is connected to the material-supply channel for providing the fluid material to the material-supply channel and the fluid material is transmitted via the material-supply channel to be dispensed on the base.

Based on the above, the printing head in the exemplary embodiment is formed by assembling multiple assembling pieces that are same in shape, and contact surfaces of any two adjacent assembling pieces respectively have material-supply grooves thereon that correspond to each other. Therefore, when the assembling pieces are assembled to form the printing head, the material-supply grooves of any two adjacent assembling pieces are combined to form the material-supply channel of the printing head. Thus, the assembling pieces for forming the printing head of the exemplary embodiment can be manufactured in large quantities using the same mold, which is conducive to mass production. Moreover, since the printing head is formed by assembling multiple assembling pieces, the assembly thereof is easy and conducive to cleaning, replacement, and maintenance. Accordingly, the production efficiency of the 3-D printing apparatus is improved and maintenance costs are reduced.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
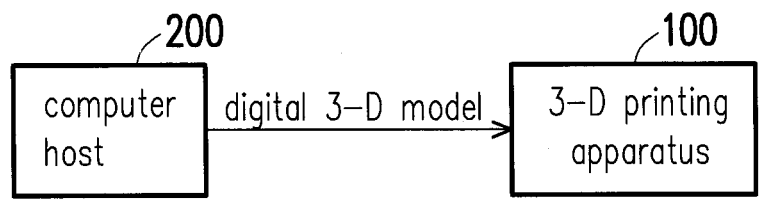
FIG. 1 is a schematic diagram showing an operating environment of a 3-D printing apparatus according to an exemplary embodiment.

It is to be understood that both of the foregoing and other detailed descriptions, features, and effects are intended to be described more comprehensively by providing embodiments accompanied with figures hereinafter. In the following embodiments, wording used to indicate directions, such as "up," "down," "front," "back," "left," and "right," merely refers to directions in the accompanying drawings. Therefore, the directional wording is used to illustrate rather than limit the disclosure. Moreover, the same or similar reference numerals represent the same or similar elements in the following embodiments.

Figure 2:
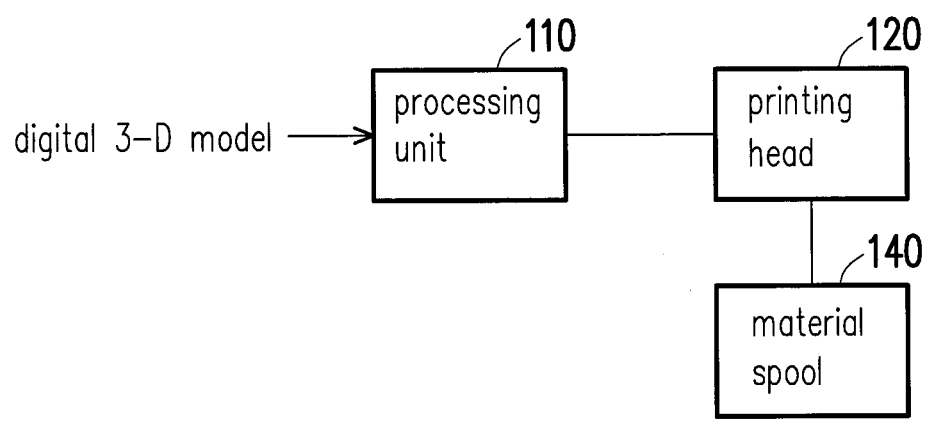
FIG. 2 is a block diagram showing a portion of a 3-D printing apparatus according to an exemplary embodiment.
Figure 3:
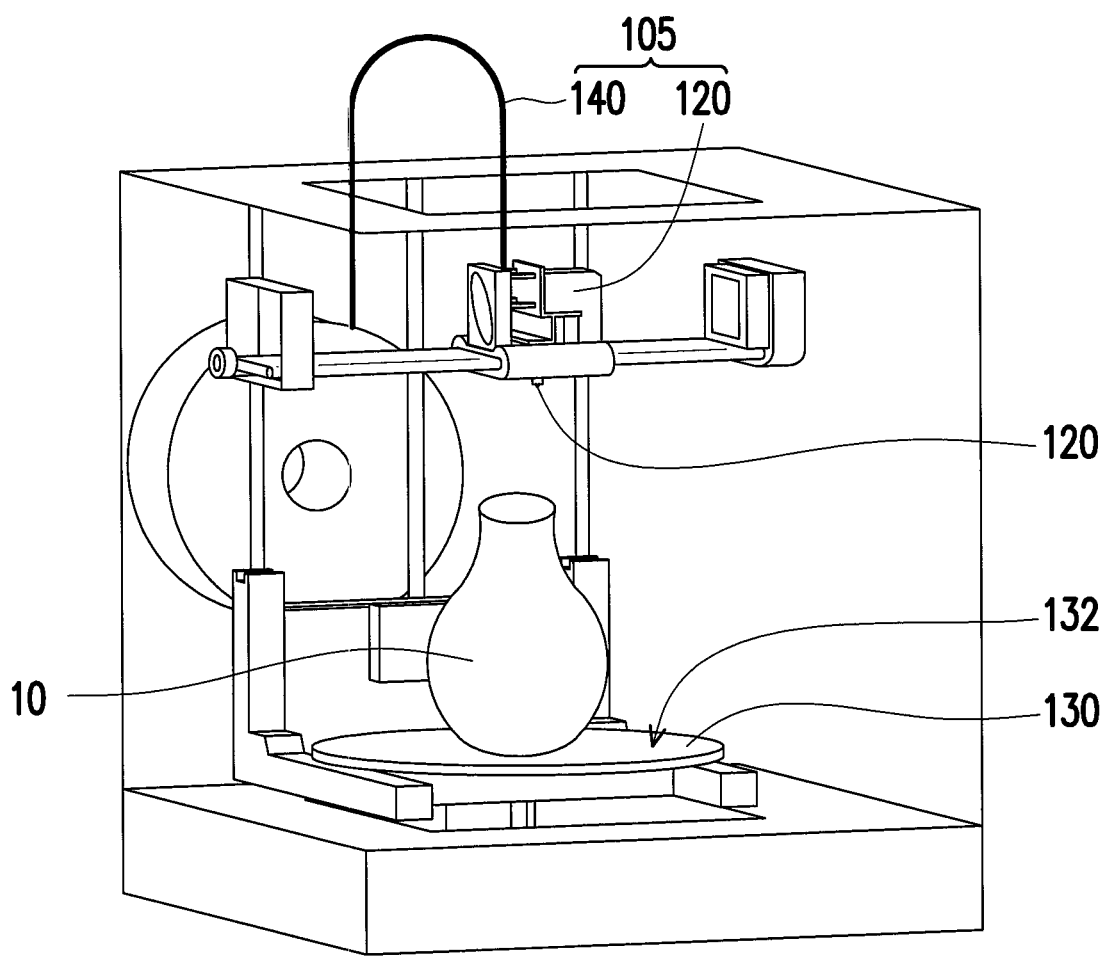
FIG. 3 is a schematic diagram depicting some members of a 3-D printing apparatus according to an exemplary embodiment.

FIG. 1 is a schematic diagram showing an operating environment of a three dimensional (3-D) printing apparatus according to an exemplary embodiment. FIG. 2 is a block diagram showing a portion of a 3-D printing apparatus according to an exemplary embodiment. FIG. 3 is a schematic diagram depicting some members of a 3-D printing apparatus according to an exemplary embodiment. With reference to FIG. 1 to FIG. 3, in this embodiment, a 3-D printing apparatus 100 is adapted for printing a 3-D object 10 according to a digital 3-D model. The 3-D printing apparatus 100 includes a processing unit 110, a printing head module 105, and a base 130. The printing head module 105 includes a printing head 120 and at least one material spool 140. The processing unit 110 is coupled to and controls the printing head 120 and a heating unit 150 respectively. In this embodiment, the processing unit 110 is configured to read the digital 3-D model, wherein the digital 3-D model may be a digital 3-D image file that is built by a computer host 200 by means of computer-aided design (CAD) or animation modeling software, for example.

Further to the above, the base 130 has a bearing surface 132 for bearing a fluid material dispensed by the printing head 120. The printing head 120 is disposed above the base 130 and is controlled by the processing unit 110 so as to dispense the fluid material by layers on the bearing surface 132 to form a plurality of material layers. The material layers are stacked on each other to form the 3-D object 10. The material spool 140 is coupled to the printing head 120. In this embodiment, the at least one material spool 140 is used for providing at least one fluid material to at least one material-supply channel of the printing head 120 respectively. More specifically, the fluid material is formed by material suitable for fabrication methods such as stereolithography, fused filament fabrication (FFF), melted and extrusion modeling, and electron beam modeling, etc. For example, the method of fused filament fabrication includes using a heating unit of the printing head 120 to heat a spool of solid material, so as to melt the spool of the solid material into the fluid material that is in a molten state. The printing head 120 then transmits the fluid material via the material-supply channel of the printing head 120 to dispense the fluid material on the base, thereby forming the plurality of material layers. Thereafter, a curing and drying process, for example, is performed to form the 3-D object 10.

FIG. 4 to FIG. 8 are schematic top views depicting different printing heads and assembling pieces thereof according to different exemplary embodiments. To be more specific, as shown in FIG. 4 to FIG. 8, the printing head 120 includes a plurality of assembling pieces 122, wherein the assembling pieces 122 are assembled to each other to form the printing head 120. It is noted that the left side of each of FIG. 4 to FIG. 8 depicts one of the assembling pieces 122 required for forming the printing head 120 according to different exemplary embodiments, while the right side of each of FIG. 4 to FIG. 8 depicts the printing head 120 obtained by assembling the assembling pieces 122 shown on the left side. Also, in FIG. 4 to FIG. 8, the same reference numerals are used to represent the same or similar elements.

Further to the above, each of the assembling pieces 122 includes at least one material-supply groove 122*a*. More specifically, each of the assembling pieces 122 includes at least one contact surface 122*b* to be in contact with and assembled to the contact surface 122*b* of the adjacent assembling piece 122. Each material-supply groove 122*a* is located on the contact surface 122*b* of the corresponding assembling piece 122, and the material-supply grooves 122*a* of any two adjacent assembling pieces 122 are disposed corresponding to each other. Thus, when the assembling pieces 122 are assembled to each other to form the printing head 120, the material-supply grooves 122*a* of any two adjacent assembling pieces 122 together form a material-supply channel 126 as shown on the right side of each of FIG. 4 to FIG. 8.

Figure 4:
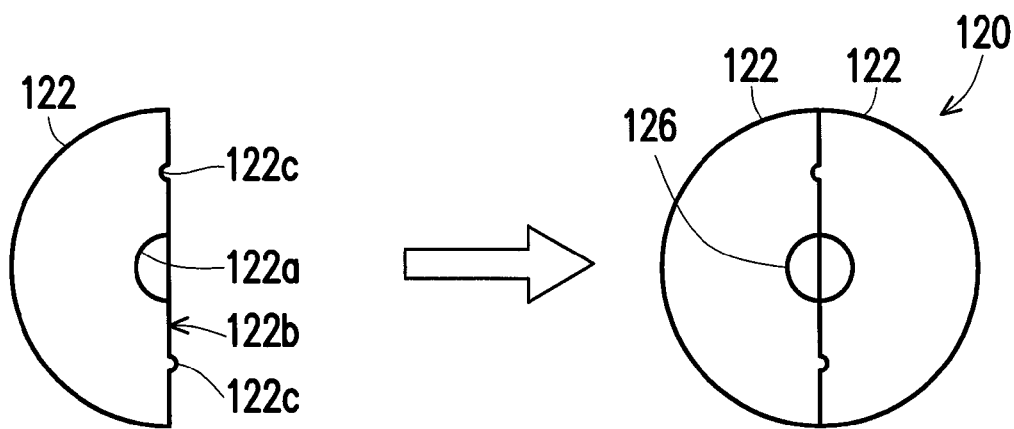
FIG. 4 to FIG. 8 are schematic top views depicting different printing heads and assembling pieces thereof according to different exemplary embodiments.
Figure 5:
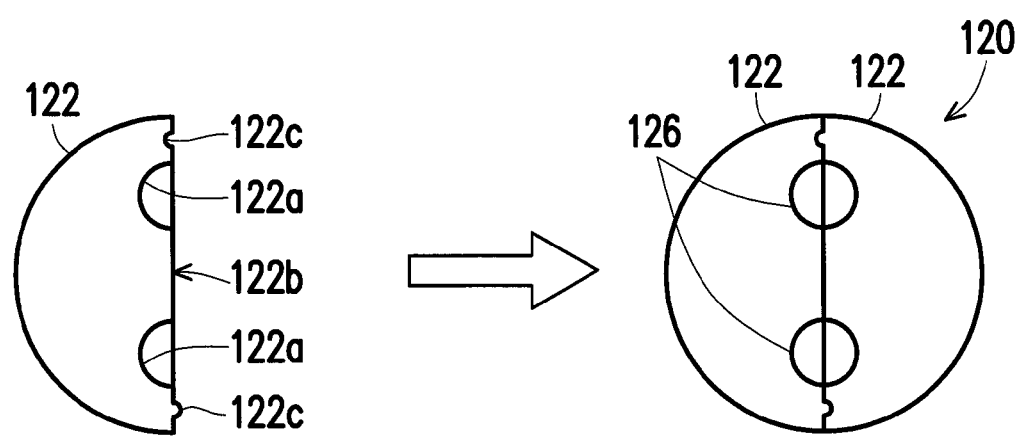
Figure 6:
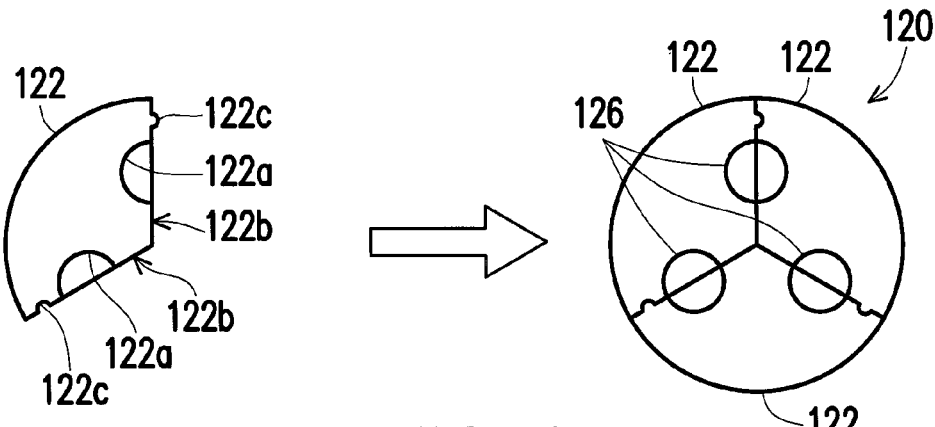
Figure 7:
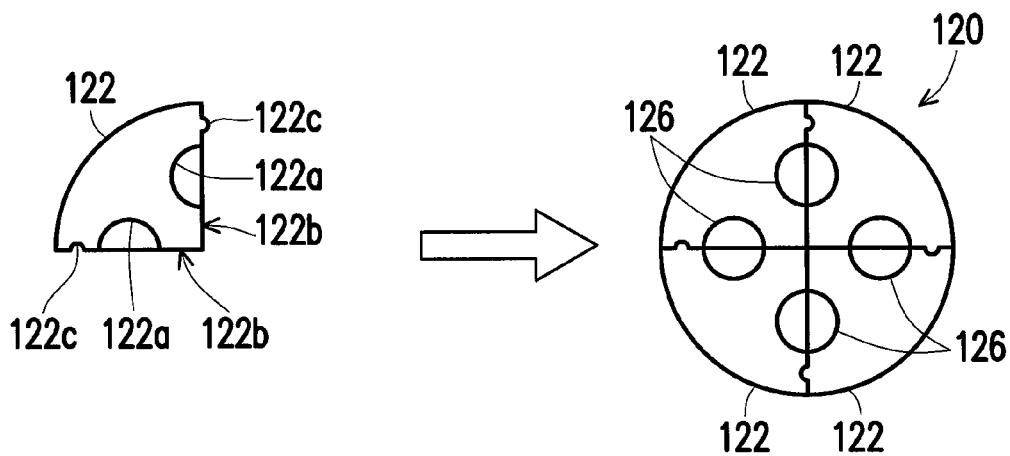
Figure 8:
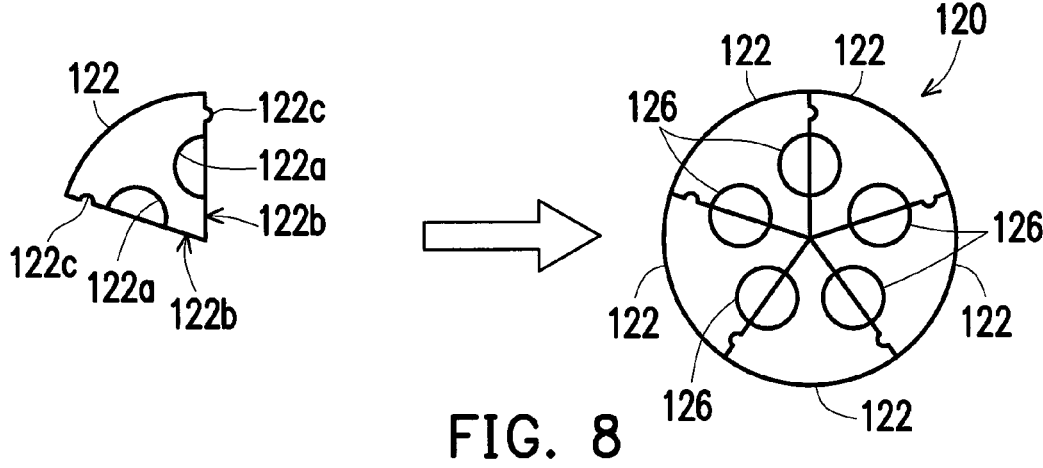

More specifically, each assembling piece 122 may have only one contact surface 122*b* as shown in FIG. 4 and FIG. 5, or have multiple contact surfaces 122*b* as shown in FIG. 6 to FIG. 8. Each contact surface 122*b* may have only one material-supply channel 126 as shown in FIG. 4 and FIG. 6 to FIG. 8. Of course, each contact surface 122*b* may have multiple material-supply channels 126 as shown in FIG. 5. It is given that the number of the material-supply channels 126 is N. In a situation that each contact surface 122*b* has only one material-supply groove 122*a* thereon, an angle between two adjacent contact surfaces 122*b* of each assembling piece 122 is 360/N degrees. For example, each contact surface 122*b* of the assembling piece 122 in FIG. 7 has only one material-supply groove 122*a*, and the number of the material-supply channels 126 is 4. Accordingly, the angle between two adjacent contact surfaces 122*b* of each assembling piece 122 in FIG. 7 is 90 degrees (i.e. 360/4=90). Nevertheless, if each contact surface 122*b* of the assembling piece 122 has multiple material-supply grooves 122*a* thereon, a relationship between the angle between two adjacent contact surfaces 122*b* and the number of the material-supply channels 126 is not limited to the aforementioned.

In addition, each contact surface 122*b* may further include at least one engaging part 122*c*, and any two adjacent assembling pieces 122 are engaged with each other by the engaging parts 122*c* that are disposed correspondingly. For example, the corresponding contact surfaces 122*b* of any two adjacent assembling pieces 122 respectively have an engaging protrusion and an engaging recess that structurally match each other, as shown in FIG. 4 to FIG. 8, for assembling any two adjacent assembling pieces 122 through engagement of the engaging protrusion and the engaging recess to form the printing head 120. Thereafter, an adhesive gel is further filled between any two adjacent assembling pieces 122 by a dispensing process and the adhesive gel is cured by a curing process, for example, so as to fix the bonding between two adjacent assembling pieces 122.

Figure 9:
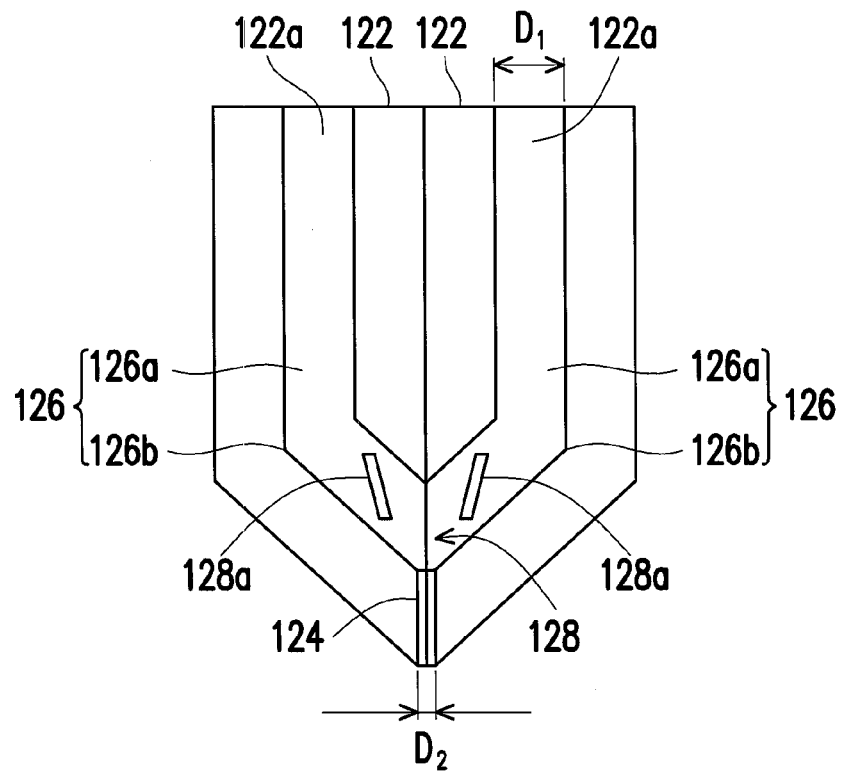
FIG. 9 is a schematic cross-sectional view depicting a printing head of a 3-D printing apparatus according to an exemplary embodiment.

FIG. 9 is a schematic cross-sectional view depicting a printing head of a 3-D printing apparatus according to an exemplary embodiment. With reference to FIG. 3 and FIG.

9, in this embodiment, the assembling pieces 122 are assembled with each other to form the printing head 120 and together define a nozzle 124 of the printing head 120. The material spool 140 is connected to the material-supply channel 126 of the printing head 120. The material spool 140 may be a solid material spool composed of hot-melt material. The solid material spool is, for example, heated by the heating unit of the printing head 120, so that the hot-melt material is melted into the fluid material to be supplied to the material-supplied channel 126 of the printing head 120. In this embodiment, the hot-melt material may be a hot-melt polymer material, such as polylactic acid (PLA) or acrylonitrile butadiene styrene (ABS) resin, for example. More specifically, the heating unit is used to heat the printing head 120 to increase a temperature of the material-supply channel 126 of the printing head 120 to be higher than a melting point of the hot-melt material, so as to melt the hot-melt material into the fluid material. Then, the printing head 120 transmits the fluid material to the nozzle 124 via the material-supply channel 126, as shown in FIG. 9, so as to dispense the fluid material on the base 130, as shown in FIG. 3.

With such an arrangement, the printing head 120 of this embodiment is formed by assembling the assembling pieces 122 that are same in shape, and the contact surfaces 122b of any two adjacent assembling pieces 122 respectively have the material-supply grooves 122a thereon that correspond to each other. Therefore, when the assembling pieces 122 are assembled to form the printing head 120, the material-supply grooves 122a of any two adjacent assembling pieces 122 are combined to form the material-supply channel 126. Thus, the assembling pieces 122 for forming the printing head 120 of this embodiment can be manufactured in large quantities by using the same mold, and the assembling pieces 122 are then assembled to form a plurality of the printing heads 120, which is conducive to mass production. Moreover, since the printing head 120 is formed by assembling multiple assembling pieces 122, the assembly thereof is easy and conducive to replacement and maintenance.

Generally speaking, the number of the material spools 140 may correspond to the number of the material-supply channels 126 of the printing head 120, so as to respectively provide fluid materials with different characteristics, such as colors or properties, to different material-supply channels 126 respectively. The processing unit 110 may select corresponding fluid materials according to characteristic parameters of the digital 3-D model and control the printing head 120 to dispense the selected fluid materials to the bearing surface 132 of the base 130 for forming the 3-D object 10. For example, the material-supply channels 126 are connected to multiple material spools 140 respectively, wherein the colors of the fluid materials provided by the material spools 140 are different from each other (for example, the colors of the fluid materials are red, yellow, blue, and white), and color characteristic parameter of the digital 3-D model is red. The processing unit 110 reads the color characteristic parameter of the digital 3-D model and accordingly selects the red fluid material, and then controls the printing head 120 to apply the red fluid material onto the bearing surface 112, thereby forming a red 3-D object 10. In addition, the 3-D printing apparatus 100 may switch the selected fluid material according to the color characteristic parameter of the digital 3-D model during the formation of the 3-D object 10, such that the printing head 120 applies fluid materials of different colors to form the 3-D object 10 with different colors.

It should be noted that, even if the printing head 120 has only one material-supply channel 126 as shown in FIG. 4, the 3-D printing apparatus 100 may still be provided with multiple material spools 140, and the multiple material spools 140 may respectively provide multiple fluid materials that have different colors, for example. Accordingly, the processing unit 110 may select one of the fluid materials according to the color characteristic parameter of the digital 3-D model and connect the material spool 140 corresponding to the selected fluid material with the material-supply channel 126 of the printing head 120, and then control the printing head 120 to apply the fluid material connected thereto onto the bearing surface 132 of the base 130 for forming the 3-D object 10.

Figure 10:
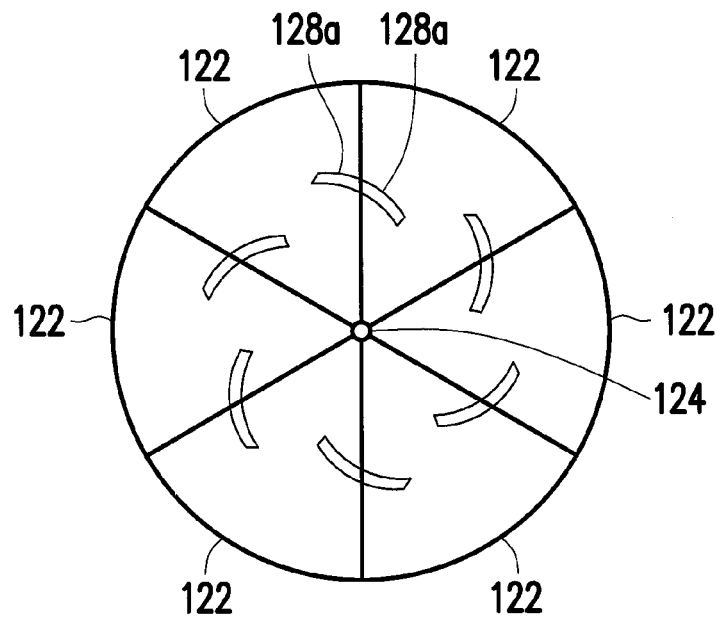
FIG. 10 is a schematic top view depicting a material-mixing member of a printing head of a 3-D printing apparatus according to an exemplary embodiment.

FIG. 10 is a schematic top view depicting a material-mixing member of a printing head of a 3-D printing apparatus according to an exemplary embodiment. With reference to FIG. 9 and FIG. 10, in this embodiment, the 3-D printing apparatus 100 may include a plurality of material-supply channels 126 and a plurality of material spools 140 corresponding thereto. The material spools 140 respectively provide a plurality of fluid materials having different characteristics. For example, the fluid materials provided by the material spools 140 have different color characteristics, and the processing unit 110 may simultaneously select multiple material spools 140 according to the color characteristic parameter of the digital 3-D model and apply the fluid materials provided therefrom to the bearing surface 132 of the base 130. That is, in this embodiment, the processing unit 110 may simultaneously select multiple material spools 140, which have different characteristics, according to the color characteristic parameter of the digital 3-D model and connect the selected material spools 140 respectively to the corresponding material-supply channels 126. The fluid materials, having different characteristics, provided by the selected material spools 140 are then respectively transmitted to the nozzle 124 of the printing head 120 via the corresponding material-supply channels 126.

To be more specific, each of the material-supply channels 126 includes an extension portion 126a and a bent portion 126b. For example, the extension portions 126a respectively extend along a normal direction of a bearing surface of a base (e.g. the bearing surface 132 of the base 130 shown in FIG. 3), and the bent portions 126b are connected with the corresponding extension portions 126a respectively and converge at the nozzle 124 as shown in FIG. 9. Thus, the material-supply channels 126 converge at the nozzle 124 and define a material-mixing chamber 128 at a junction of the material-supply channels 126, wherein the material-mixing chamber 128 communicates with the nozzle 124. Therefore, the selected fluid materials that have different characteristics gather in the material-mixing chamber 128 via the corresponding material-supply channels 126 to be mixed adequately and then the evenly mixed fluid materials can be dispensed onto the base 130 via the nozzle 124. Moreover, in this embodiment, the material-mixing chamber 128 may further include a plurality of material-mixing members 128a, as shown in FIG. 10, disposed on a flowing path of each fluid material for changing the flowing direction of each fluid material toward the nozzle 124 and forcing each fluid material to be mixed with other fluid materials having different characteristics. Thereafter, the evenly mixed fluid materials are extruded via the nozzle 124 and dispensed on the base 130. Here it needs to be explained that, in this embodiment, the material-mixing members 128a may be a plurality of ribs, bumps, or stirring blades, etc., for example. The material-mixing members 128a may be arranged radially or spirally. However, the disclosure here is not intended to limit the form and arrangement of the material-mixing members 128a of the exemplary embodiment.

For example, in this embodiment, the 3-D printing apparatus 100 includes a plurality of the material spools 140, wherein the colors of the fluid materials provided by the material spools 140 may be red, yellow, blue, and white, for example, and the color characteristic parameter of the digital 3-D model is green, for example. The processing unit 110 reads the color characteristic parameter of the digital 3-D model and accordingly selects the yellow and blue fluid materials, and then connects the yellow and blue fluid materials to the corresponding material-supply channels 126. Thereby, the yellow fluid material and the blue fluid material gather in the material-mixing chamber 128 respectively via the corresponding material-supply channels 126. Components in the material-mixing chamber 128, e.g. the material-mixing members 128a, are then used to adequately mix the yellow and blue fluid materials to obtain a green fluid material. Thereafter, the evenly mixed green fluid material is applied to the base 130 via the nozzle 124 to form a green 3-D object 10. In this embodiment, the processing unit 110 may further control a mixing ratio of the fluid materials having different colors according to the color characteristic parameter of the digital 3-D model, so as to obtain colors that are closer to the digital 3-D model, thereby manufacturing a more verisimilar 3-D object 10. In addition, the 3-D printing apparatus 100 may switch the selected fluid materials according to the digital 3-D model during the formation of the 3-D object 10 to mix and obtain fluid materials having different colors, such that the printing head 120 can apply fluid materials of various colors to form the 3-D object 10 with various colors.

To sum up, the printing head of the exemplary embodiment is formed by assembling multiple assembling pieces, and the contact surfaces of any two adjacent assembling pieces respectively have material-supply grooves thereon that correspond to each other. Therefore, when the assembling pieces are assembled to form the printing head, the material-supply grooves of any two adjacent assembling pieces are combined to form the material-supply channel of the printing head. Thus, the assembling pieces for forming the printing head of the exemplary embodiment can be manufactured in large quantities by using the same mold, which is conducive to mass production. Moreover, since the printing head is formed by assembling multiple assembling pieces, the assembly thereof is easy and conducive to replacement and maintenance. Accordingly, maintenance costs are reduced.

In addition, the 3-D printing apparatus includes multiple material spools and multiple material-supply channels corresponding thereto. The processing unit, for example, selects one of the material spools according to the characteristics of the fluid materials provided by the material spool, which corresponds to the characteristic parameter of the digital 3-D model, and connects the selected material spool to the material-supply channel, and then the printing head extrudes the fluid material provided by the selected material spool to be dispensed on the base. Therefore, the 3-D printing apparatus of the disclosure is capable of selecting the fluid material having the characteristic corresponding to the characteristic parameter of the digital 3-D model, so as to manufacture the 3-D object that is closer to the digital 3-D model.

It will be apparent to those skilled in the art that various modifications and variations can be made to the disclosed embodiments without departing from the scope or spirit of the disclosure. In view of the foregoing, it is intended that the disclosure covers modifications and variations of this disclosure provided that they fall within the scope of the following claims and their equivalents.

What is claimed is:

1. A three dimensional printing apparatus, comprising:
a base; and
a printing head module disposed above the base and comprising:
a printing head comprising a plurality of assembling pieces that are assembled with each other to form the printing head and a nozzle of the printing head assembled by the plurality of assembling pieces, wherein each of the plurality of assembling pieces comprises at least one material-supply groove and a plurality of contact surfaces configured to be assembled with the contact surfaces of the adjacent assembling piece, the contact surfaces of each of the assembling pieces are not coplanar with one another, and the material-supply grooves of any two adjacent assembling pieces are located corresponding to each other and assembled to form at least one material-supply channel; and
at least one material spool connected to the material-supply channel to provide at least one fluid material to the at least one material-supply channel respectively and the fluid material is transmitted via the material-supply channel to be dispensed on the base by the nozzle.

2. The three dimensional printing apparatus according to claim 1, wherein the material-supply grooves are located on the contact surfaces of the assembling pieces.

3. The three dimensional printing apparatus according to claim 1, wherein the number of the at least one material-supply groove on each contact surface is plural.

4. The three dimensional printing apparatus according to claim 1, wherein the number of the at least one material-supply groove on the each contact surface is one, the number of the at least one material-supply channels of the printing head is N, and an angle between the contact surfaces of each of the assembling pieces is 360/N degrees.

5. The three dimensional printing apparatus according to claim 1, wherein each contact surface comprises at least one engaging part, and any two adjacent assembling pieces are engaged with each other by the engaging parts that are disposed correspondingly.

6. The three dimensional printing apparatus according to claim 1, the number of the at least one material-supply channel and the number of the at least one material spool are both plural, wherein the material spools provide a plurality of fluid materials respectively, and the fluid materials respectively have a plurality of characteristics that are different from each other.

7. The three dimensional printing apparatus according to claim 6, wherein each of the material-supply channels comprises an extension portion and a bent portion, wherein the extension portions respectively extend along a normal direction of a bearing surface of the base, and the bent portions are connected with the corresponding extension portions respectively and converge at the nozzle.

8. The three dimensional printing apparatus according to claim 6, wherein the material-supply channels converge at the nozzle and define a material-mixing chamber that communicates with the nozzle at a junction of the material-supply channels, and the fluid materials in the material-supply channels are respectively transmitted to the material-mixing chamber to be mixed via the corresponding material-supply channels.

9. The three dimensional printing apparatus according to claim 8, wherein the material-mixing chamber comprises a plurality of material-mixing members through which the fluid materials pass to be mixed.

10. The three dimensional printing apparatus according to claim 1, wherein an included angle between the contact surfaces of each of the assembling pieces is larger than 0 degree and less than 180 degrees.

11. The three dimensional printing apparatus according to claim 10, wherein the included angles of the assembling pieces are the same.

12. A printing head module capable of supplying at least one fluid material to be dispensed on a base, the printing head module comprising:
- a printing head comprising a plurality of assembling pieces that are assembled with each other to form the printing head and a nozzle of the printing head assembled by the plurality of assembling pieces, wherein each of the plurality of assembling pieces comprises at least one material-supply groove and a plurality of contact surfaces configured to be assembled with the contact surfaces of the adjacent assembling piece, the contact surfaces of each of the assembling pieces are not coplanar with one another, and the material-supply grooves of any two adjacent assembling pieces are located corresponding to each other and assembled to form at least one material-supply channel; and
- at least one material spool connected to the material-supply channel to provide the fluid material to the at least one material-supply channel respectively and the fluid material is transmitted via the material-supply channel to be dispensed on the base by the nozzle.

13. The printing head module according to claim 12, wherein the material-supply grooves are located on the contact surfaces of the assembling pieces.

14. The printing head module according to claim 12, wherein the number, of the at least one material-supply groove on each contact surface is plural.

15. The printing head module according to claim 12, wherein the number of the at least one material-supply groove on each contact surface is one, the number of the at least one material-supply channels of the printing head is N, and an angle between the contact surfaces of each of the assembling pieces is 360/N degrees.

16. The printing head module according to claim 12, wherein each contact surface comprises at least one engaging part, and any two adjacent assembling pieces are engaged with each other by the engaging parts that are disposed correspondingly.

17. The printing head module according to claim 12, the number of the at least one material-supply channel and the number of the at least one material spool are both plural, wherein the material spools provide a plurality of fluid materials respectively, and the fluid materials respectively have a plurality of characteristics that are different from each other.

18. The printing head module according to claim 17, wherein each of the material-supply channels comprises an extension portion and a bent portion, wherein the extension portions respectively extend along a normal direction of a bearing surface of the base, and the bent portions are connected with the corresponding extension portions respectively and converge at the nozzle.

19. The printing head module according to claim 17, wherein the material-supply channels converge at the nozzle and define a material-mixing chamber that communicates with the nozzle at a junction of the material-supply channels, and the fluid materials in the material-supply channels are respectively transmitted to the material-mixing chamber to be mixed via the corresponding material-supply channels.

20. The printing head module according to claim 19, wherein the material-mixing chamber comprises a plurality of material-mixing members through which the fluid materials pass to be mixed.

21. The printing head module according to claim 12, wherein an included angle between the contact surfaces of each of the assembling pieces is larger than 0 degree and less than 180 degrees.

22. The printing head module according to claim 21, wherein the included angles of the assembling pieces are the same.

* * * * *